(12) United States Patent
McLarty et al.

(10) Patent No.: US 6,481,897 B2
(45) Date of Patent: Nov. 19, 2002

(54) BEARING ASSEMBLY

(75) Inventors: Daniel R. McLarty, Burlington, CT (US); Walter Waskiewicz, Bristol, CT (US)

(73) Assignee: The Torrington Company, Torrington, CT (US)

(*) Notice: Subject to any disclaimer, the term of this patent is extended or adjusted under 35 U.S.C. 154(b) by 0 days.

(21) Appl. No.: 10/003,214

(22) Filed: Oct. 29, 2001

(65) Prior Publication Data

US 2002/0037122 A1 Mar. 28, 2002

Related U.S. Application Data

(63) Continuation of application No. 09/239,650, filed on Jan. 29, 1999, now abandoned.

(51) Int. Cl.[7] .............................................. F16C 19/08
(52) U.S. Cl. ..................... 384/506; 384/517; 384/537
(58) Field of Search ............................... 384/506, 513, 384/517, 537, 584

(56) References Cited

U.S. PATENT DOCUMENTS

| 3,489,468 A | 1/1970 | Buck |
| 4,571,226 A | 2/1986 | Molloy et al. ............... 474/190 |
| 4,668,110 A | 5/1987 | Egeto et al. ................. 384/536 |
| 5,823,687 A | 10/1998 | Matsuda ..................... 384/558 |

FOREIGN PATENT DOCUMENTS

| DE | 196 15 416 | 10/1997 |
| GB | 1112668 | 5/1968 |

Primary Examiner—Lenard A. Footland
(74) Attorney, Agent, or Firm—Michael Best & Friedrich LLP

(57) ABSTRACT

An annular casing partially encloses the outer race of a pair of the angular contact bearings. The casing is split along a radial plane into two casing halves, each casing half being molded of a polymer. The two casing halves are retained axially such that relative axial movement of the angular contact bearings is limited.

12 Claims, 4 Drawing Sheets

BEARING ASSEMBLY

This application is a continuation of application Ser. No. 09/239,650, filed Jan. 29, 1999, now abandoned.

BACKGROUND OF THE INVENTION

This invention relates generally to angular contact bearings with rolling elements and, more particularly, to a bearing assembly having a casing enclosing angular contact bearings.

Angular contact bearings have been used in pairs for mounting spindles, wheel hubs, and other devices to provide a controlled bearing clearance or preload, thereby reducing bearing freeplay. Generally, the races of the angular contact bearings are machined to close tolerances and are positioned in machined housings to provide the desired clearance or preload. Seals and other components may be added. Due to the expense of machining and the difficulty of precisely mounting one bearing with respect to the other, the use of angular contact bearings has been limited to a relatively few applications.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing assembly comprising a pair of opposed angular contact bearings, each bearing having rolling elements between inner and outer races made of metal. An annular casing partially encloses the outer race of the angular contact bearings. The casing is split along a radial plane into two casing halves, each casing half being molded of a polymer. The two casing halves are retained axially such that relative axial movement of the angular contact bearings is limited.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
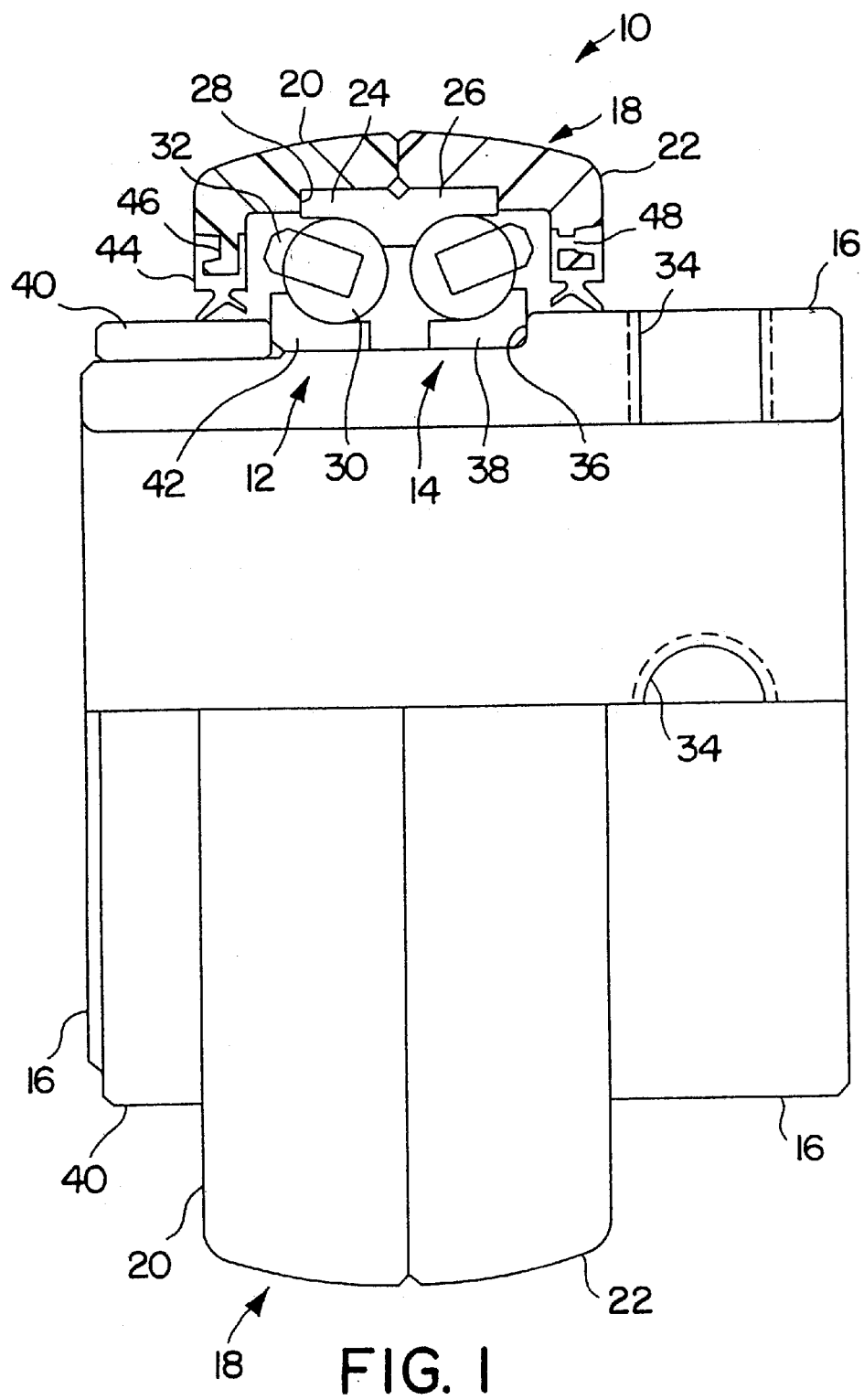
FIG. 1 is a cross sectional view of a bearing assembly illustrating the present invention.

Referring now to the drawings, FIG. 1 illustrates a bearing assembly 10 having a pair of angular contact bearings 12 and 14, in opposed relationship, positioned between a flanged shaft 16 and an annular casing 18. The annular casing 18 is split along a radial plane into two casing halves 20 and 22, molded of polymer, that partially enclose outer races 24 and 26 of angular contact bearings 12 and 14, respectively.

The casing halves 20 and 22 surround and enclose a radially outward surface of the outer races 24 and 26 and include a flange or shoulder 28 that engages an axial end of the outer races. The casing halves may be configured to include a mechanical interlock and are retained axially such that relative axial movement of the angular contact bearings is limited. In this embodiment, the casing halves are two identical clam shell-shaped pieces that capture the outer races 24 and 26 and are joined together by ultrasonic welding or bonding, for example.

Rolling elements 30 in this embodiment are balls that are located by retainers 32; however, tapered rollers or other configurations may be used. The flanged shaft 16 includes a shoulder or flange 36 that engages an axial end of inner race 38 of angular contact bearing 14. A sleeve 40 is pressed over the flanged shaft 16 and against an axial end of inner race 42 of angular contact bearing 12 such that the inner races 40 and 42 are located axially between the flange 36 and the sleeve 40 with a predetermined clearance or preload.

In the embodiment of FIG. 1, flanged shaft 16 is tubular and is extended axially to provide tapped holes 34 for set screws. This configuration, combined with a spherical outer surface of annular casing 18, allows bearing assembly 10 to serve in place of a "wide inner" ball-type radial bearing for use as a self-aligning bearing in a pillow block or flanged housing. For other applications, flanged shaft 16 could have a square or hexagonal bore, for example, or could be a solid shaft.

Seals 44 may be of various configurations and may be molded over axial end portions of annular casing 18. As illustrated, annular casing 18 may include annular grooves 46 and circumferentially distributed openings 48 to mechanically lock the seal 44 to the annular casing 18, supplementing the bounding of the two materials. Preferably, annular casing 18 is molded of an engineered thermoplastic, for example nylon, polyester (PET) or polysulfone, with glass fibers for reinforcement. Seals 44 may be molded of a thermoplastic elastomer such as Dupont Hytrel, for example.

Figure 2:
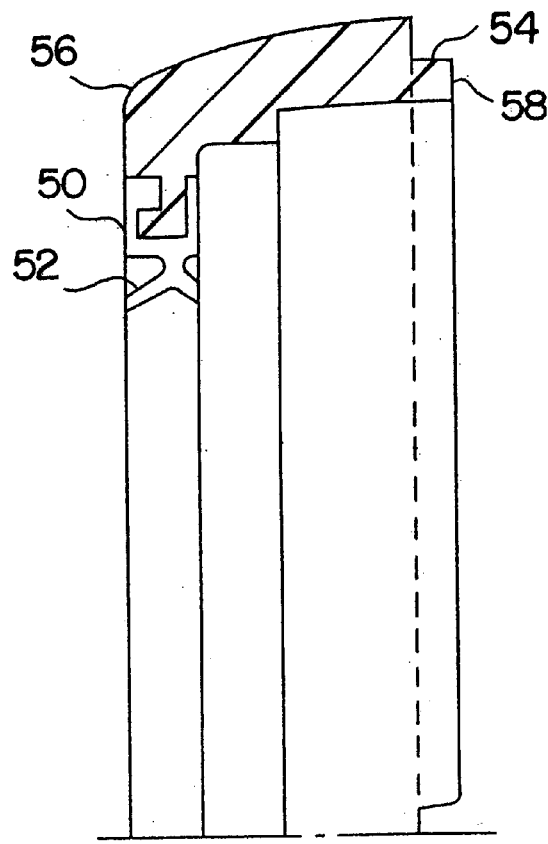
FIGS. 2 and 3 are cross sectional views of portions of bearing assemblies having alternative seals, illustrating the present invention.

FIG. 2 illustrates a similar embodiment having alternative seals 50 similar to seals 44 but having lips 52 that are more robust, suitable for agricultural or mining applications with heavy contamination. FIG. 2 also illustrates groove 54 on casing half 56 that extends circumferentially, forming an extending lip 58 for engaging a corresponding groove in an adjacent casing half, thereby forming a mechanical interlock. Two lips 52 may extend about 90 degrees in circumference, located diametrically, allowing the two casing halves to be identical.

Figure 3:
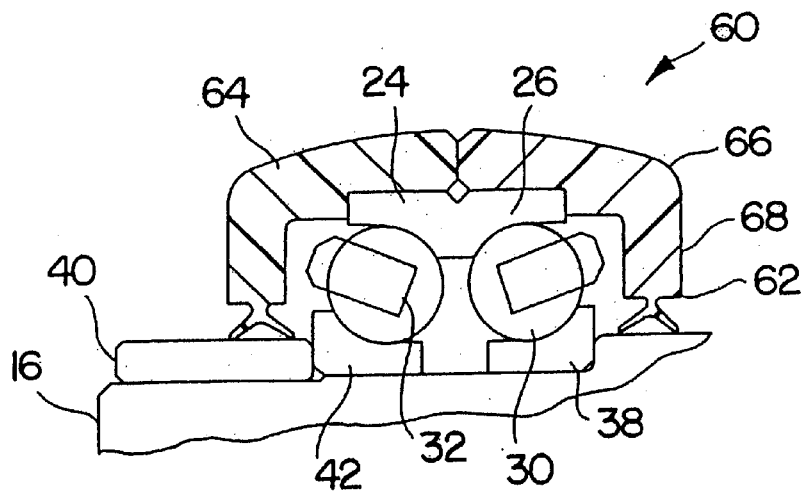

FIG. 3 illustrates bearing assembly 60 having seals 62 that are formed integrally with casing halves 64 and 66. Instead of molding in two stages, as described for FIG. 1, seals 62 are formed by a co-injection process employing simultaneous injection of the two different materials. In this process, the two melt fronts merge in a predetermined area, providing a transition zone 68 between the engineered thermoplastic of the casing halves and the thermoelastic polymer of the seals 62. With this co-injection process, no mechanical interlock of the seals and casing halves is required.

The casing halves can be designed to suite specific application requirements. The integral seal feature adds further to the customization of a design to a specific application.

Figure 4:
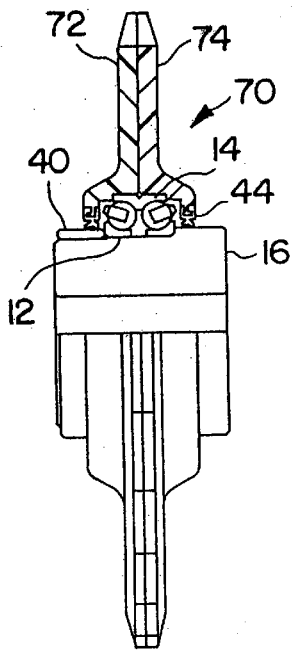
FIGS. 4 through 8 are cross sectional view of bearing assemblies illustrating other embodiments of the present invention.
Figure 5:
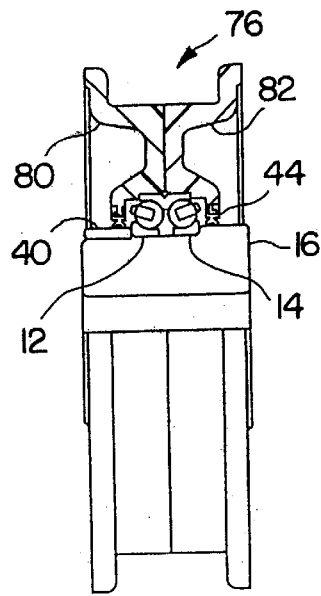
Figure 6:
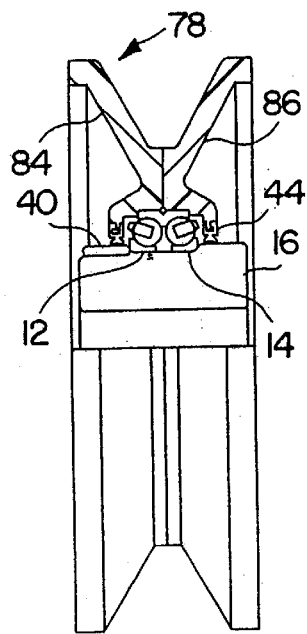

FIG. 4 illustrates a bearing assembly 70 with casing halves 72 and 74 that are configured to form an idler sprocket. FIGS. 5 and 6 illustrate bearing assemblies 76 and 78 with casing halves 80, 82 and 84, 86, respectively, that form idler pulleys with square and V-shaped grooves. The angular contact bearings 12 and 14, seals 44, sleeve 40, and flanged shaft 16 are similar to those of the embodiment of FIG. 1 and, therefore, have been identified with the same reference numerals.

Figure 7:
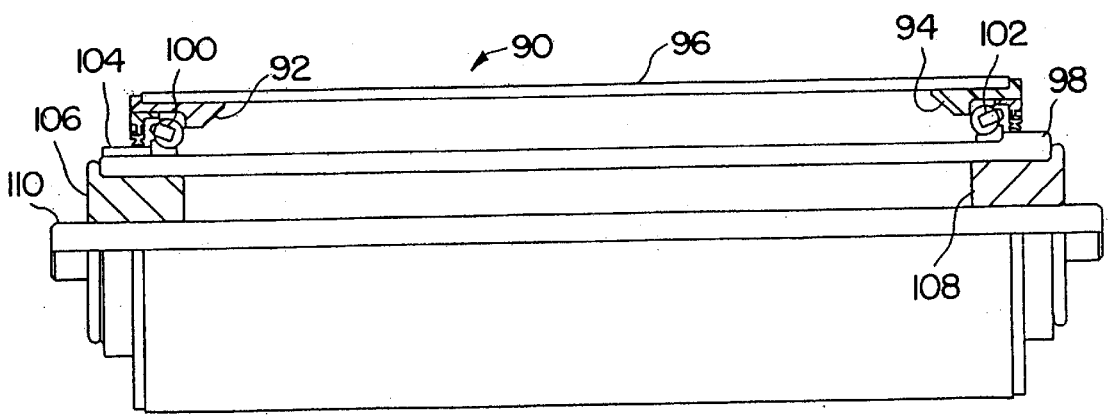

FIG. 7 illustrates a bearing assembly 90 with casing halves 92 and 94 that are retained axially by a cylindrical tube 96 to form a conveyor roll. In this embodiment, a flanged shaft 98 is elongated, compared to flanged shaft 16; however, the angular contact bearings 100 and 102 are retained by a pressed-on sleeve 104 in the same manner as the other embodiments. If desired, the conveyor roll may be spaced radially outwardly by installation of end plugs 106 and 108 between flanged shaft 98 and a shaft 110.

Figure 8:
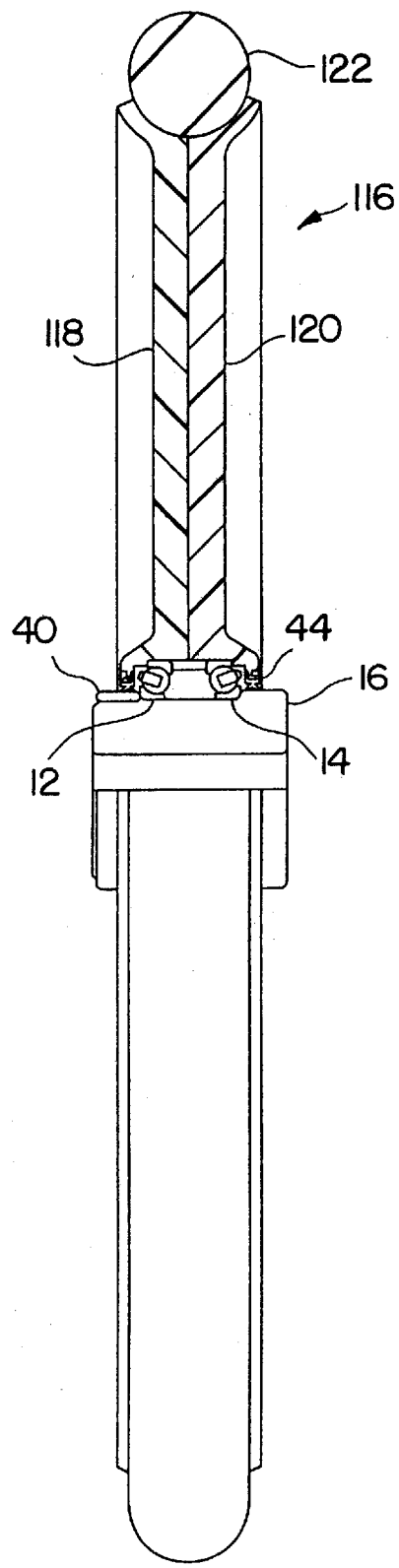

FIG. 8 illustrates a bearing assembly 116 similar to those of FIGS. 4 through 6. Casing halves 118 and 120 extend radially outwardly and receive a rubber tire or ring 122 to form a seeder cover wheel, for use in agricultural seeding equipment.

Significantly, the angular contact bearings used in the bearing assembly of the present invention may have bearing races that are formed from sheetmetal rather than by machining from solid material, thereby reducing manufacturing cost. The joining of the casing halves may be accomplished in a number of ways. Possible choices are adhesive bonding, ultrasonic welding, non-separable mechanical interlocks where disassembly isn't required, and fasteners such as nuts and bolts or polymer self-threading screws where disassembly may be required.

The incorporation of an integral seal provides the advantages of excellent seal retention, expanded seal design options, reduced number of parts, and lower manufacturing cost. The seal can be produced using a number of processes. For example, insert molding, two shot molding and co-injection molding may be used to produce the casing with the integral seal. Production volumes may influence the preferred process.

Having described the invention, what is claimed is:

1. A bearing assembly comprising:
    a pair of opposed angular contact bearings, each angular contact bearing having rolling elements between inner and outer races made of metal;
    an annular casing partially enclosing the outer race of the angular contact bearings, the casing being split along a radial plane into two casing halves, the casing halves being molded of a polymer; and
    retaining means for retaining the two casing halves axially such that relative axial movement of the angular contact bearings is limited, wherein the casing halves are made of an engineered thermoplastic and the seals are made of a thermoplastic elastomer, the casing halves and the seals being molded in a two-step molding process and being retained together by a mechanical interlock.

2. A bearing assembly comprising:
    a pair of opposed angular contact bearings, each angular contact bearing having rolling elements between inner and outer races made of metal;
    an annular casing partially enclosing the outer race of the angular contact bearings, the casing being split along a radial plane into two casing halves, the casing halves being molded of a polymer;
    retaining means for retaining the two casing halves axially such that relative axial movement of the angular contact bearings is limited; and
    a flanged shaft positioned within the angular contact bearings and a sleeve pressed over the flanged shaft such that the inner races of the angular contact bearings are between the sleeve and the flange of the flanged shaft to provide a preload.

3. A bearing assembly comprising:
    a pair of opposed angular contact bearings, each angular contact bearing having rolling elements between inner and outer races made of metal;
    an annular casing partially enclosing the outer race of the angular contact bearings, the casing being split along a radial plane into two casing halves, the casing halves being molded of a polymer;
    retaining means for retaining the two casing halves axially such that relative axial movement of the angular contact bearings is limited; and a flanged shaft positioned within the angular contact bearings and a sleeve pressed over the flanged shaft such that the inner races of the angular contact bearings are between the sleeve and the flange of the flanged shaft to provide a predetermined clearance.

4. A bearing assembly comprising:
    a pair of opposed angular contact bearings, each angular contact bearing having rolling elements between inner and outer races made of metal;
    an annular casing partially enclosing the outer race of the angular contact bearings, the casing being split along a radial plane into two casing halves, the casing halves being molded of a polymer; and
    retaining means for retaining the two casing halves axially such that relative axial movement of the angular contact bearings is limited.

5. A bearing assembly according to claim 1, wherein the casing halves extend radially outwardly to form a wheel.

6. A bearing assembly according to claim 1, wherein the casing halves have a spherically convex outer surface facilitating self-alignment of the bearing assembly.

7. A bearing assembly according to claim 1, further comprising a seal on each casing half.

8. A bearing assembly according to claim 7, wherein the casing halves are made of an engineered thermoplastic and the seals are made of a thermoplastic elastomer, the casing halves and the seals being formed by simultaneous injections of the respective polymers such that the two materials merge.

9. A bearing assembly according to claim 1, wherein the retention means includes a cylindrical tube spacing the casing halves axially such that the bearing assembly forms a conveyor roll.

10. A bearing assembly according to claim 1, wherein the bearing races are formed of sheetmetal.

11. A bearing assembly according to claim 1, wherein the casing halves are identical and include interlock means for providing alignment and mechanical interlock of the two casing halves.

12. A bearing assembly according to claim 1, wherein the angular contact bearings are mounted such that a predetermined preload on the angular contact bearings is provided.

* * * * *